Patented Sept. 29, 1931

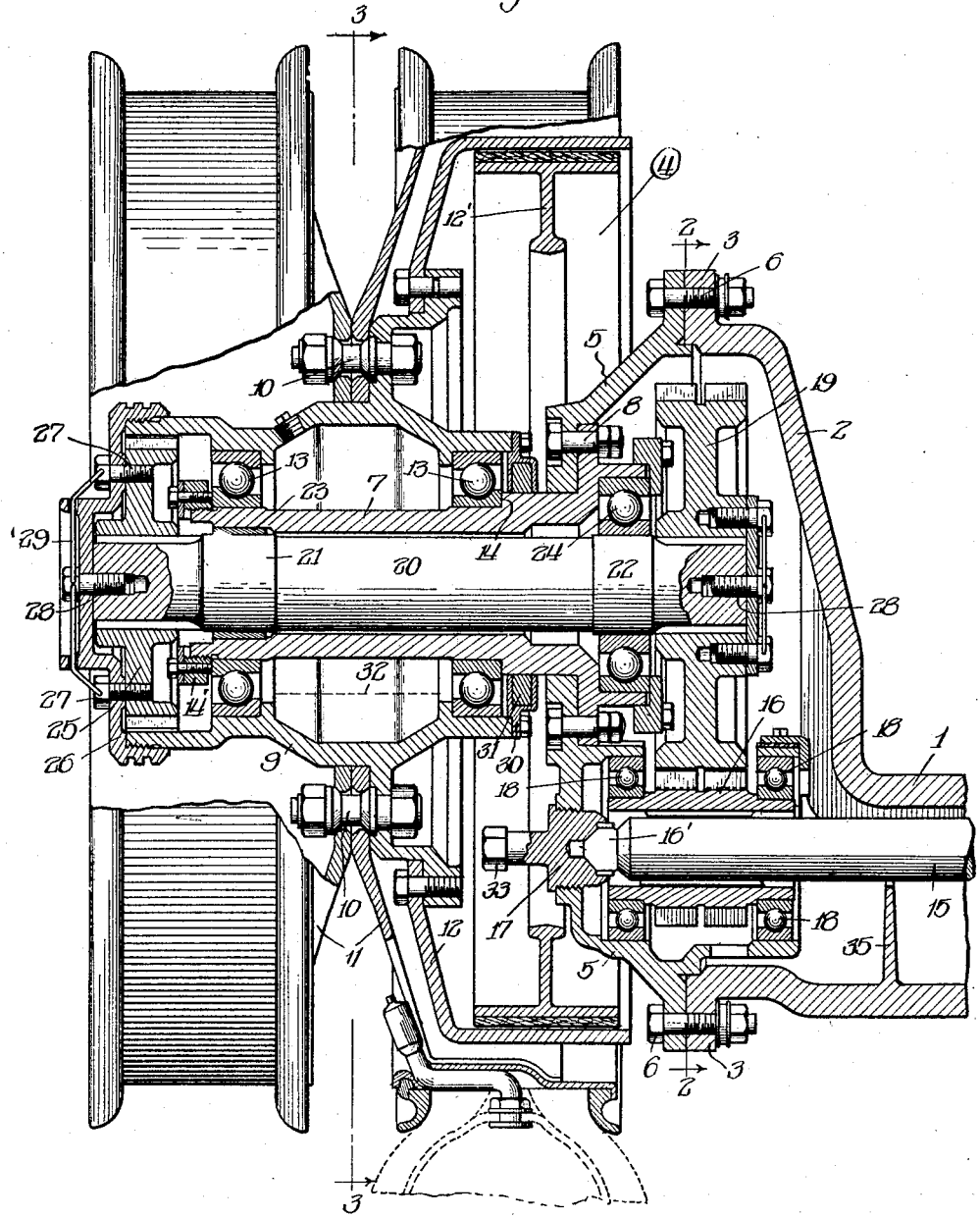

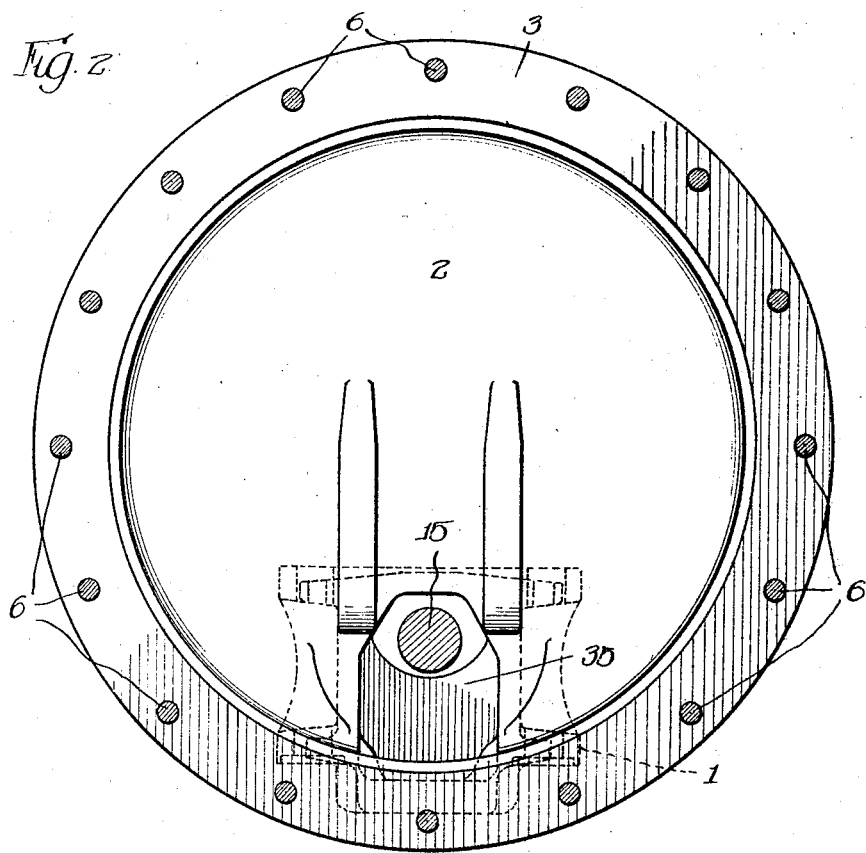
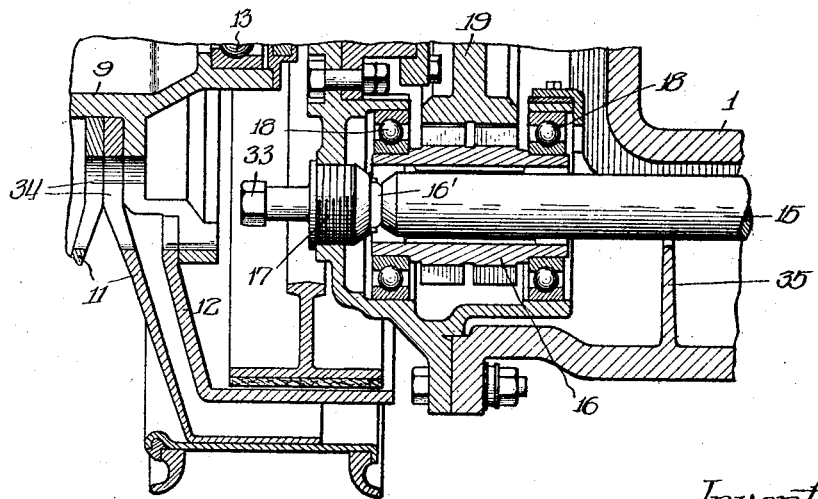

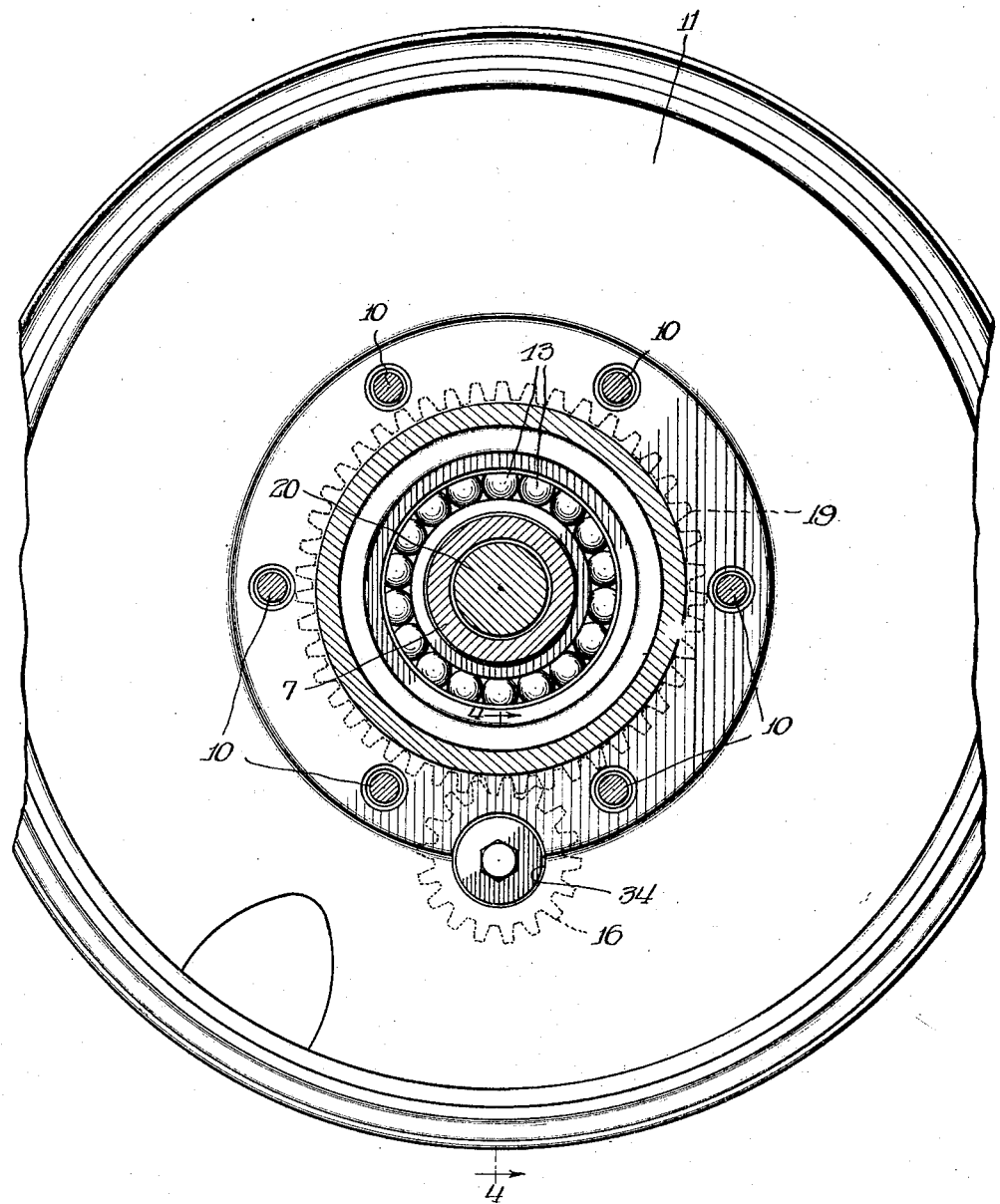

1,824,793

UNITED STATES PATENT OFFICE

JOHN RIISE, OF DOYLESTOWN, OHIO

REAR AXLE CONSTRUCTION

Application filed September 21, 1925. Serial No. 57,621.

The present invention relates to rear axle constructions.

The invention is particularly adaptable to motor vehicles which are called upon to perform heavy duty, such, for example, as motor buses, and has for one of its objects the provision of a rear axle construction which is mounted at a low level, so that the capacity of the motor vehicle may be a maximum though the center of mass is located at a relatively low point.

A further object is to provide an axle construction which is readily accessible for inspection and repairs.

A further object is to provide a rear axle construction in which the drive shaft therein may be removed when desired without requiring the removal of the wheels of the motor vehicle.

A further object is to provide a rear axle construction in which the drive shafts which transmit driving power from the differential gearing of a motor car may be mounted at a lower level than the axes of the rear wheels, in which construction the wheels and driving mechanism therefor may be conveniently handled as a unit independently of the relatively stationary parts of said motor car.

A further object is to provide a rear axle construction of low slung type in which the driving shafts can be assembled or removed without removing the corresponding wheels of the car.

A further object is to provide a rear axle construction in which wide bearing surfaces may be provided, whereby the axle housing may be made of relatively light metal.

A further object is to provide a rear axle construction in which a relatively large amount of oil may be carried without danger of leakage.

A further object is to provide a rear axle construction which, in addition to possessing the advantages above referred to, is characterized by improved safety.

Further objects will appear as the description proceeds.

Referring to the drawings—

Figure 1 is a sectional view illustrating part of a rear axle housing, a rear wheel, and driving mechanism for said rear wheel embodying the principles of the present invention;

Figure 2 is an end view of said housing taken along the plane indicated by the arrows 2—2 of Figure 1;

Figure 3 is a view taken along the plane indicated by the arrows 3—3 of Figure 1, the wheel being shown rotated slightly from the position indicated in Figure 1 for the purpose of clearly illustrating the manner in which the drive shaft may be readily removed; and Figure 4 is a sectional view taken along the plane indicated by the arrows 4—4 of Figure 3.

The numeral 1 indicates an axle housing, which axle housing is adapted to be mounted at a relatively low region on a motor vehicle and is provided with the enlarged end portion 2, which enlarged end portion 2 provides the flange 3. The end portion 2 extends upwardly from the remainder of the housing, or, in other words, is eccentrically disposed relatively thereto. The flange 3 provides a bearing surface of relatively great area for connection with the unit which is indicated as a whole by the numeral 4.

The unit 4 includes the cover or supporting member 5, which is bolted to the flange 3 of the axle housing 1 by bolts 6, or is secured by any other preferred holding means. Secured to the supporting member 5 is the tubular wheel spindle 7. The supporting member 5 and the tubular wheel spindle 7 are shown as being secured together by means of bolts 8, though it is perfectly practicable to make said members 5 and 7 from a one-piece forging, in which event a reduction in the weight of the member 5 could be made. The numeral 9 indicates the wheel hub, which has secured thereto, by means of the bolts 10—10, the two wheel members 11—11, which in the illustrated embodiment of the present invention make up one of the rear wheels. Secured interiorly of the innermost of the wheel members 11—11 is the brake drum 12, which may be operated upon by suitable friction members to perform braking functions. Part of the operating mechanism for causing frictional engagement with the drum 12 is indicated by the numeral 12'. Said mechanism 12' will be controlled from a relatively stationary part of the car, and, as indicated in Figure 1 of the drawings, does not interfere with the assembly and removal of the wheel members 11—11.

The wheel hub 9 is rotatably mounted upon the tubular wheel spindle 7 by means of ball bearings 13—13, which are held against a shoulder 14 on the wheel spindle 7 by means of the bearing lock nut 14', which may be locked in position by any preferred means.

Referring now to the power transmitting mechanism, attention is directed to the main drive shaft 15, one extremity of which will be connected to the differential gearing (not shown) in the longitudinal center line of the motor vehicle. Non-rotatably but slidably connected with the shaft 15 is the pinion 16, which may be of the spur type, or the herring bone type, or any other preferred type. The extremity of the shaft 15 adjacent to pinion 16 abuts upon a thrust button 16' carried by screw 17 mounted in a hole in the supporting member 5. Said pinion 16 is mounted in ball bearings 18—18 supported from the supporting member 5. Said pinion 16 meshes with the gear 19, which has non-rotatably secured thereto a secondary drive shaft 20. Said secondary drive shaft 20 is provided with the enlarged circumferential portions 21 and 22. The portion 21 of the secondary drive shaft 20 has a bearing upon the bushing 23 which is pressed into the tubular wheel spindle 7. The portion 22 of the secondary drive shaft 20 is carried by the ball bearing 24. The outer extremity of the secondary drive shaft 20 is splined to the driving or clutch member 25, which in turn is splined to the wheel hub 9. A hub cap 26 is provided, which has screw-threaded engagement with the wheel hub 9 and which is locked on hub 9 by cap screws 27, which are threaded into said member 25. The cap screws 27 prevent the cap 26 from backing off and also hold the member 25 against axial movement. A cap screw 28 is provided, threaded into shaft 20, which cap screw 28 holds and locks the shaft 20 and gear 19 against axial movement. If herring-bone gears are used in the members 19 and 16, this construction also holds the pinion 16 against axial movement. A wire 29 may be provided which extends through holes in the heads of cap screws 27 and 28 to securely lock said screws against turning, whereby loss of the hub cap 26 and loosening of member 25, shaft 20 and gear 19 is prevented. In case gear 19 and pinion 16 are herring-bone gears, loosening of the pinion 16 is also prevented. Safety is thereby promoted to a great degree.

Secured to the wheel hub 9 is the felt washer retainer 30, which holds the felt washer 31 which encircles the member 7. The normal oil level within the wheel hub 9 is indicated by the numeral 32, said level being amply high to lubricate bearings 13—13 without being sufficiently high to leak between washer 31 and spindle 7. Said felt washer 31 will reduce to a minimum any leakage of oil between said washer and the wheel spindle 7. Any oil which might pass from the axle housing 1 through the clearance spacing between the portion 21 of the secondary drive shaft 20 and the bushing 23 will enter the oil chamber for the bearings 13—13. It will be apparent, therefore, the oil level 32 will be held amply high for lubricating the bearings 13—13 for the wheel hub 7, and there is little danger of oil leakage to reduce said level.

The screw 17 is provided with the head 33, which may be conveniently grasped by a suitable tool. The wheel members 11—11 are provided with apertures 34—34 (Figure 4), which may be brought into alignment with the screw 17. Said apertures 34—34 are of sufficient size to permit the removal of the screw 17. When said screw 17 has been removed from the supporting member 5, the driving shaft 15 may be removed from the housing 1. It will be seen, therefore, that it is not necessary to remove the wheel or the member 5 in order to take out or replace the driving shaft 15.

The numeral 35 indicates a web disposed in the bottom portion of the rear axle housing 1, which web underlies the driving shaft 15. Said web 35 acts as a dam to prevent the complete flow of oil from one extremity of the axle housing 1 to the other extremity when one wheel is disposed at a higher level than the other wheel. By reason of this construction the supply of oil is insured for the pinion 16 and the ball bearings 18, regardless of the relation between the levels of the two rear wheels.

It will be noted that the unit 4 may be readily mounted upon or removed from the rear axle housing 1, it being necessary only to remove the bolts 6 to secure the removal of said unit 4. Said unit includes all of the secondary or final drive gears with their bearings, shafts, wheels, wheel bearings and brakes. Said unit also supports the outer end of the drive shaft 15. Preferably the tubular wheel spindle is of hard material and may have the bearings 13—13 seated directly upon it.

By removing the screw 17, (the wheel being positioned so that apertures 34—34 are in alignment with said screw), the drive shaft 15 may be assembled or removed with the wheel hub 7, brake drum 12 and wheels 11 in place.

By reason of the fact that the unit 4 pilots readily into proper position on the extremity of the housing 1, and by reason of the broad surfaces in contact between said unit and the flange 3 of axle housing 1, and by reason of the further fact that the stresses are in large part taken up by the holding member 5 and its associated parts, which may be made of hard metal, it is possible and practical to make the axle housing of light weight material such as aluminum.

The present invention provides the above stated advantages of lightness of weight and convenience of assembling and disassembling with a low slung axle, the driving shaft of which is located materially below the wheel centers, whereby the center of gravity of the motor vehicle may be kept low without sacrificing loading capacity.

Though a preferred embodiment of the present invention has been described in detail, it will be clear that many modifications will occur to those skilled in the art. It is intended to cover all such modifications that fall within the scope of the appended claims.

What is claimed is:—

1. In a road vehicle, an axle housing comprising a drive shaft enclosing portion and an end portion, said end portion being enlarged upwardly, a cover mounted upon said enlarged portion, said cover being provided with an outwardly extending bearing member, and a road wheel mounted upon said bearing member, said bearing member comprising a tubular member, a drive shaft within said axle housing, a secondary drive shaft within said tubular member, and gearing, supported wholly by said cover, connecting said drive shafts.

2. In axle construction, a housing having a drive shaft enclosing portion and an enlarged portion eccentrically mounted relative to said drive shaft enclosing portion, a cover member removably secured to said enlarged portion, power transmitting mechanism supported wholly by said cover member, and a drive shaft within said housing, said power transmitting mechanism having driving relationship with said drive shaft, said power transmitting mechanism including a pinion readily slidable upon said drive shaft.

3. In an axle construction, in combination, a housing having an enlarged end eccentrically disposed relative to said housing, a cover for said end, and gearing and a wheel shaft supported wholly by said cover and forming a unitary assembled group therewith.

4. In combination, an axle housing having an enlarged end portion, said end portion being disposed eccentrically with said housing, a cover for said end portion, said cover having an outwardly extending tubular portion, a wheel hub rotatably supported by said extension, a drive shaft within said housing, a secondary drive shaft within said extension, said secondary drive shaft being keyed to said wheel hub, and power transmitting mechanism between said shafts, said secondary shaft and said power transmitting mechanism being carried by said cover, said power transmitting mechanism including a pinion readily slidable upon but non-rotatably connected to said shaft.

5. In combination, an axle housing having an enlarged end portion, said end portion being disposed eccentrically with said housing, a cover for said end portion, said cover having an outwardly extending tubular portion, a wheel hub rotatably supported by said extension, a drive shaft within said housing, a secondary drive shaft within said extension, said secondary drive shaft being keyed to said wheel hub power transmitting mechanism between said shafts, a hub cap for said wheel hub, said hub cap being screw-threaded upon said hub, and means for locking said secondary shaft to said hub cap.

6. In combination, an axle housing having an enlarged end portion, said end portion being disposed eccentrically with said housing, a cover for said end portion, said cover having an outwardly extending tubular portion, a wheel hub rotatably supported by said extension, a drive shaft within said housing, a secondary drive shaft within said extension, said secondary drive shaft being keyed to said wheel hub power transmitting mechanism between said shafts, a hub cap for said wheel hub, said hub cap being screw-threaded upon said hub, and means for non-rotatably connecting said secondary shaft to said hub cap, said means including screw bolts and a unitary member extending through said bolts for preventing rotation of said bolts.

7. In combination, an axle housing having an enlarged end portion eccentrically mounted relative to the remainder of said housing, a cover removably mounted upon said end portion, a drive shaft within said housing, a secondary drive shaft within said cover, a wheel, means for connecting said secondary drive shaft in driving relationship with said wheel, said shafts being disposed at different levels, gearing connecting said shafts, and a screw removable exteriorly of said cover mounted in said cover in end thrust relation to said first mentioned shaft, said wheel being provided with apertures permitting the removal of said screw and the withdrawal of said first-mentioned drive shaft without removal of said wheel.

8. In combination, an axle housing having an enlarged end portion eccentrically mounted relative to the remainder of said housing, a cover removably mounted upon said end portion, a drive shaft within said housing, a secondary drive shaft within said cover, a wheel, means for connecting said secondary drive shaft in driving relationship with said wheel, said shafts being disposed at different levels, gearing connecting said shafts, and a screw mounted in said cover for supporting the end thrust of said first mentioned shaft, said wheel being provided with apertures permitting the removal of said screw and the withdrawal of said first mentioned drive shaft without removal of said wheel.

9. In combination, in a motor vehicle, an axle housing, said axle housing having an enlarged end portion eccentrically mounted relative to the remainder of said housing, a cover for said enlarged end portion, a shaft within said housing, a secondary shaft carried by said cover, gearing between said shafts, said secondary shaft being disposed at a higher level than said first mentioned shaft, and screw means removable exteriorly of said cover carried by said cover for retaining said first mentioned shaft, said wheel being provided with apertures permitting the removal of said screw and the withdrawal of said first mentioned drive shaft without removal of said wheel.

10. In combination, in a motor vehicle, an axle housing, said axle housing having an enlarged end portion eccentrically mounted relative to the remainder of said housing, a cover for said enlarged end portion, a shaft within said housing, a secondary shaft carried by said cover, gearing between said shafts, said secondary shaft being disposed at a different level than said first mentioned shaft, and screw means carried by said cover, said screw means being disposed in substantial alignment with said first mentioned shaft, a wheel rotatably connected to said cover and having a driving connection with said secondary shaft, said wheel being provided with an aperture for permitting removal of said screw means and said first mentioned shaft without the removal of said wheel.

11. In combination, an axle housing, a cover for closing the end thereof, a shaft within said housing, a secondary shaft carried by said cover, power transmitting mechanism for transmitting power from said first mentioned shaft to said second mentioned shaft, said power transmitting mechanism being carried by said cover, and a screw for supporting end thrust of said first mentioned shaft, said shaft being removable when said screw is removed.

12. In combination, an axle housing having an enlarged end portion, a cover for said end portion, a shaft within said housing, a secondary shaft carried by said cover, a gear non-rotatably secured to said secondary drive shaft, a pinion non-rotatably secured to said first mentioned shaft but readily slidable thereon and rotatably carried by said cover, said cover being provided with an aperture for permitting the endwise movement of said first mentioned shaft relative to said pinion, and a removable stopper member for said aperture having endwise thrust engagement with said first mentioned shaft.

13. In combination, an axle housing having an enlarged end portion, a cover for said end portion, a shaft within said housing, a secondary shaft carried by said cover, a gear non-rotatably secured to said secondary drive shaft, a pinion non-rotatably secured to said first mentioned shaft but slidable thereon and rotatably carried by said cover, said cover being provided with an aperture for permitting the endwise movement of said first mentioned shaft, and means for closing said aperture and limiting endwise movement of said shaft.

14. In combination, an axle housing having a drive shaft enclosing portion, a drive shaft therein, said axle housing having an enlarged end portion, a cover for said end portion, a secondary drive shaft rotatably carried by said cover, power transmitting mechanism between said shafts, said cover and said housing being formed to provide a pocket for lubricant, and a web in said axle housing underlying said first mentioned shaft for preventing the complete escape of lubricant from said pocket when said axle is tilted.

15. In an axle construction, in combination, a housing having an enlarged end eccentrically disposed relative to said housing, a cover for said end, a gear and a pinion supported wholly by said cover and a drive shaft for said pinion having its outer end slidably mounted within said pinion.

16. In combination, an axle housing having an enlarged end portion, said end portion being disposed eccentrically with said housing, a cover for said end portion, said cover having an outwardly extending tubular portion, a wheel hub rotatably supported by said extension, a drive shaft within said housing, a secondary drive shaft within said extension, said secondary drive shaft being fixedly connected to said wheel hub and gearing connecting said shafts, said secondary shaft and said gearing being carried by said cover, part of said gearing being non-rotatably but slidably connected to said first mentioned drive shaft.

17. In combination, in a motor vehicle, an axle housing having an enlarged end portion eccentrically disposed relative to the remainder of said housing, a cover for said enlarged end portion, a shaft within said housing, a secondary shaft carried by said cover, gearing between said shafts which gearing is carried by said cover, and screw means carried by said cover in endwise thrust relationship with said first mentioned shaft for retaining said first mentioned shaft.

18. In a road vehicle, in combination, an axle housing comprising a drive shaft enclosing portion and an end portion, said end portion being enlarged upwardly, a cover mounted upon said enlarged portion, said cover being provided with an outwardy extending bearing member and a road wheel mounted upon said bearing member, said bearing member comprising a tubular member, a drive shaft within said axle housing, a secondary drive shaft within said tubular member, a gearing supported wholly by said cover connecting said drive shafts, said gearing including a gear non-rotatably connected to said secondary drive shaft and a pinion non-rotatably connected to said first mentioned drive shaft, said cover being provided with bearings for said pinion disposed upon the two sides of said pinion and carried by said cover.

Signed at Doylestown, Ohio, this 17th day of September, 1925.

JOHN RIISE.